United States Patent Office 2,983,212
Patented May 9, 1961

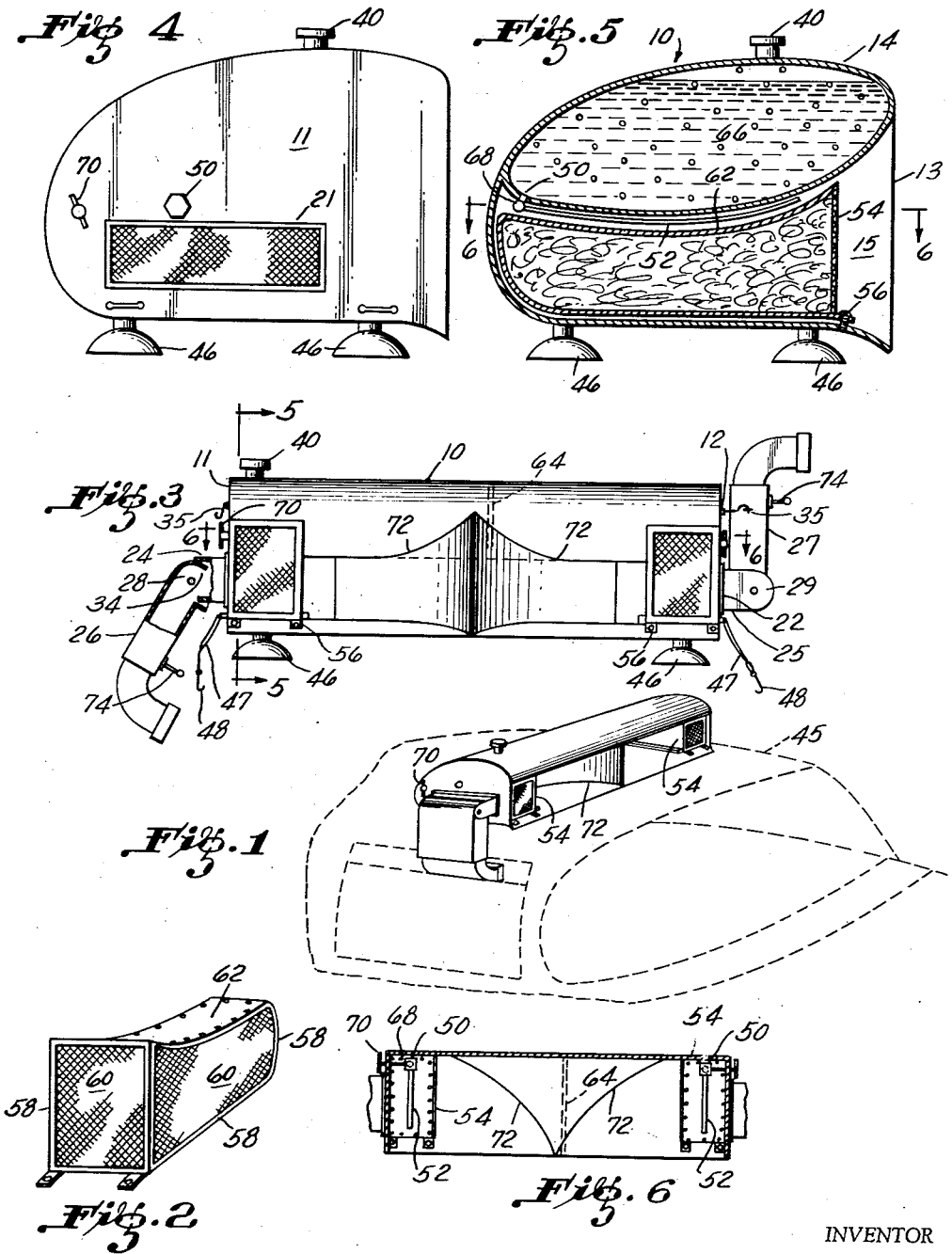

2,983,212
REMOVABLE AIR CONDITIONING UNITS FOR AUTOMOBILES

Gregory Poole, 4834 N. 31st St., Phoenix, Ariz.

Filed Aug. 26, 1957, Ser. No. 680,224

4 Claims. (Cl. 98—2)

This invention relates to removable air conditioning units for automobiles and relates to my similarly entitled co-pending application for Letters Patent filed November 26, 1956, Serial No. 624,280, now Patent No. 2,887,031, issued May 19, 1959.

An object of the present invention is to provide an air conditioner or cooler which may be instantly installed and removed from an automobile not requiring any permanent connections or defacing the automobile body.

Another object of the invention is to provide an air conditioner light in weight, easy to install and which has no machinery requiring constant adjustment as with units employing fans, compressors, etc.

A further object of my invention is to provide an air conditioner the discharge ducts of which may be elevated above the top of the car door when not in use.

A still further object of my invention is to provide a liquid coolant reservoir of the gravity feed type in which the rate of feed flow of the coolant to the diffuser and fibrous absorbent material may be regulated with ease from the outside of the unit to control the cooling rate for air passing thereover and to avoid filling the fibrous material cartridges with coolant fluid which may be blown directly into the automobile in its liquid state.

A further object of the present invention is to provide a device of the character described having vehicle intake ducts which may be easily inserted into and out of the vehicle window and rocked to an up position and there locked when not in use and which may be so related with the main casing as to materially reduce the supply of cooled air directed thereto when the duct is in the raised or up position.

A further object of the present invention is to provide an improved automobile air conditioner having replaceable cooling cartridges.

With the foregoing and other objects in view the invention will be more full described hereinafter, and will be more particularly pointed out in the claims appended hereto.

In the drawings, wherein like symbols refer to like or corresponding parts throughout the several views:

Figure 1 is a perspective view of a removable air conditioning unit for automobiles shown attached to an automobile indicated in dotted lines.

Figure 2 is a perspective view of a replaceable cooling cartridge containing fibrous absorbent material.

Figure 3 is a front elevational view of a unit constructed in accordance with the present invention.

Figure 4 is a side elevational view of the unit of Figure 3 taken from the left hand end thereof with the vehicle inlet duct removed.

Figure 5 is a transverse section taken along the line 5—5 in Figure 3.

Figure 6 is a sectional view of the apparatus according to the present invention taken at the line 6—6 in Figure 3.

Referring more particularly to the drawings and for the moment to Figures 3 through 6 inclusive, 10 designates generally a casing having end walls 11 and 12. The casing is as shown in Figure 5, semi-parabolic, having air inlet openings 13 at its intake end. Separated by and secured to the end walls 11 and 12 is a liquid coolant reservoir or tank 14, of elliptical section. This reservoir is positioned to form beneath it an intake chamber 15 of reduced area from forward aft.

Duct openings, 21 and 22 are provided in the end walls 11 and 12 and are generally rectangular in section. Cooperating with the duct openings 21 and 22 are two duct stubs 24 and 25 secured to the end walls 11 and 12 as by welding or otherwise. These stubs 24 and 25 cooperate with the vehicle ventilation supply ducts 26 and 27 which are of similar cross-section and are joined thereto by pivots 28 and 29. The pivots are secured to the stub ducts. The ducts 26 and 27 leading to the vehicle have a projection 34 extending beyond the duct body whereby to cut off the air when the duct is raised to the position of the right hand duct in Figure 3. The ducts 26 and 27 are retained in the raised or elevated condition by hooks or like fastenings 35.

Referring more particularly to Figure 5, elliptically shaped coolant reservoir 14 is provided at the bottom thereof with a drain 50 and connecting with drain 50 is a tubing 52 disposed along the bottom of the coolant reservoir in a forward direction and provided with a number of perforations or holes along its length. Beneath this tubing is located a removable replaceable cooling cartridge 54 secured to the casing 10 by means of screws 56. This replaceable cooling cartridge is shown in more detail in Figure 2. It is made of stiff wire or other thin semi-rigid material designated at 58. Its top panel is covered with canvas or other diffusing material designated at 62. Its remaining sides are covered with screen designated at 60 and the cartridge contains excelsior or other porous absorbent material. The cartridge can be removed merely by removing screws 56 and sliding the cartridge in a forward direction out of the conditioner air chamber. Coolant reservoir 14 is provided with a dividing partition 64 perforated with holes 66 to arrest the rapid flow of coolant liquid from one side of the coolant reservoir to the other as when the automobile may be in a tilted attitude.

A valve 68 is located between drain 50 and tubing 52 to control the flow of liquid into cartridge 54 so that too much liquid will not be allowed to saturate cartridge 54. Valve 68 is controlled by means of valve handle 70 from outside the conditioner.

It may be seen from Figure 6 that cartridge 54 is duplicated on both ends of the conditioner, as well as the means for providing coolant thereto.

Curved deflecting means 72 are provided for directing air from air intake 13 towards cartridges 54. Air is thus directed from the forward end of the automobile by the deflecting means 72 through cartridges 54 to duct openings 21 and 22 and thence to the inside of the automobile by means of ducts 26 and 27.

The unit is adapted to be supported on top of a vehicle 45 and to rest upon suction cups 46 and be retained in place by straps 47 having hooks 48 which cooperate with the drain gutter on the vehicle. Small rods 74 having rubber tips on the ends thereof are secured to ducts 26 and 27 to keep the duct from coming in contact with the car metal or glass and to enable the car door in opening to push the duct up without having the duct bind in the window.

In operation the unit may be applied to a vehicle as follows:

The unit is placed upon top of a vehicle and suction cups 46 seated in position and hooks 48 applied to the drain gutter of the vehicle and straps 47 drawn taut. The cap 40 on the filling connection is removed and the reservoir tank 14 is filled with water or other coolant after which the cap 40 is screwed down tight. The rate of coolant liquid flow from the tank 14 to the excelsior or other porous absorbant material contained in cartridge 54 is controlled by valve handle 70. Valve handle 70 (one on each side) is opened until a desired amount of liquid coolant flows into cartridge 54. The inlet ducts are unhooked and the ducts inserted into the vehicle windows. The parabolic shape of the casing 10 cooperates with the elliptical shape of tank 14 to form a throat or diminishing area to increase the velocity of air flowing through air inlet 13 into cartridges 54 wherein the coolant liquid in the excelsior absorbs heat from the incoming air by the process of evaporation and the cooled air is then discharged into the openings 21 and 22 in the end walls 11 and 12 of the casing into ducts 26 and 27 and thence into the vehicle.

It will be noted that when the unit is employed in a passenger vehicle that due to the average high speed of travel forward the rate of air flow into the car will be sufficient to not require the vehicle to be sealed. In fact an air outlet will be necessary. It has been found that with the window of the vehicle rolled up against the duct and with the duct tight against the top of the door frame, the width of the duct being less than the width of the window, adequate air escape is attained. However, when applied to heavy trucks on mountain runs it becomes necessary to seal the window all the way around the duct and to provide a discharge opening in a suitable place in the cab of a tractor and to insert an exhaust blower in the opening to pull a slight vacuum in the cab of the tractor to pull air through the ducts and from the cooling chamber of the unit. Under slow speed conditions the ram effect of the air into the unit is lost. This condition is not generally true with the average passenger vehicle which may attain high average cruising speeds.

Upon completion of the journey when it is desired to remove the unit from the vehicle it will be of assistance if the tank 14 is provided with the drain 50 at one side thereof proximate its bottom. Upon opening the drain 50 the contents of the tank will be discharged and lessen the weight of the unit.

Although I have disclosed herein the best form of the invention known to me at this time, I reserve the right to all such modifications and changes as may come within the scope of the following claims.

What is claimed is:

1. In an air conditioning unit for use with an automobile, a casing having an open front, side walls with an opening therethrough, a bottom wall, a liquid reservoir in the upper part of said casing, the bottom of said reservoir being spaced above the casing bottom wall, and the reservoir bottom and the casing side and bottom walls defining a chamber, the open front of said casing communicating with said chamber, a unitary cartridge in said casing comprising spaced walls of relatively rigid material having absorbent material therein, the transverse dimensions of said cartridge being smaller than the transverse dimensions of said chamber open front whereby said cartridge may be inserted into said chamber through the open front thereof, one wall of said cartridge being exposed to air entering said casing through said inlet, said one cartridge wall being foraminous to permit air to pass therethrough, a second foraminous wall in said cartridge registering with the opening in the side wall of said casing, means above said cartridge for conducting liquid from said reservoir into said cartridge, and duct means communicating with the interior of said cartridge through the opening in said side wall of the casing and adapted to deliver air cooled in said cartridge into the automobile.

2. In an air conditioning unit for use with an automobile as set forth in claim 1, said liquid reservoir being substantially elliptical in cross section when viewed transversely of the major axis thereof, the forward portion of said liquid reservoir being above the open front of the casing.

3. In an air conditioning unit for use with an automobile as set forth in claim 2, the bottom wall of said casing being downwardly curved at the forward end thereof to thereby provide a Venturi open front for said casing between said casing bottom wall and said reservoir bottom wall.

4. In an air conditioning unit for use with an automobile, a casing having an open front, side walls having an opening therethrough, a bottom wall, a liquid reservoir in the upper part of said casing, the bottom of said reservoir being spaced above the casing bottom wall, and the reservoir bottom and the casing side and bottom walls defining a chamber, the open front of said casing communicating with said chamber, a pair of unitary cartridges in said casing each comprising spaced walls of relatively rigid material having absorbent material therein, the transverse dimensions of each said cartridge being smaller than the transverse dimensions of said chamber open front whereby said cartridges may be inserted into said chamber through the open front thereof, said cartridges being laterally spaced apart, one wall of each said cartridge being generally parallel to and exposed to air entering said casing through said inlet, said one cartridge walls being foraminous to permit air to pass therethrough, a second foraminous wall in said cartridge registering with the opening in the side wall of said casing, means above said cartridge for conducting liquid from said reservoir into said cartridges, and duct means communicating with the interior of said cartridges through the opening in said side wall of the casing and adapted to deliver air cooled in said cartridges into the automobile.

References Cited in the file of this patent

UNITED STATES PATENTS

| | | |
|---|---|---|
| 1,988,262 | Burchkhalter et al. | Jan. 15, 1935 |
| 2,108,587 | Jones | Feb. 15, 1938 |
| 2,223,884 | Bolan | Dec. 3, 1940 |
| 2,262,384 | Cooper | Nov. 11, 1941 |
| 2,277,552 | Kneedler | Mar. 24, 1942 |
| 2,453,018 | Kercheval | Nov. 2, 1948 |
| 2,503,323 | Collins | Apr. 11, 1950 |
| 2,517,998 | Gilchrist et al. | Aug. 8, 1950 |
| 2,552,819 | Schwarzmayr | May 15, 1951 |
| 2,700,927 | Jordan | Feb. 1, 1955 |
| 2,887,031 | Poole | May 19, 1959 |